United States Patent
Beard et al.

(10) Patent No.: US 10,909,045 B2
(45) Date of Patent: Feb. 2, 2021

(54) SYSTEM, METHOD AND APPARATUS FOR FINE GRANULARITY ACCESS PROTECTION

(71) Applicant: Arm Limited, Cambridge (GB)

(72) Inventors: Jonathan Curtis Beard, Austin, TX (US); Curtis Glenn Dunham, Austin, TX (US); Reiley Jeyapaul, Haverhill (GB); Roxana Rusitoru, Cambridge (GB)

(73) Assignee: Arm Limited, Cambridge (GB)

( * ) Notice: Subject to any disclaimer, the term of this patent is extended or adjusted under 35 U.S.C. 154(b) by 1 day.

(21) Appl. No.: 16/228,042

(22) Filed: Dec. 20, 2018

(65) Prior Publication Data

US 2020/0201791 A1 Jun. 25, 2020

(51) Int. Cl.
*G06F 12/14* (2006.01)
*G06F 12/10* (2016.01)

(52) U.S. Cl.
CPC ......... *G06F 12/1458* (2013.01); *G06F 12/10* (2013.01); *G06F 2212/1052* (2013.01)

(58) Field of Classification Search
CPC .............. G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2003/0691–0698;
(Continued)

(56) References Cited

U.S. PATENT DOCUMENTS 6,775,747 B2 * 8/2004 Venkatraman ........ G06F 9/3842 711/137
7,383,391 B2 * 6/2008 Davis .................. G06F 12/0862 711/137

(Continued)

OTHER PUBLICATIONS

Chi-Keung Luk, "Tolerating memory latency through software-controlled pre-execution in simultaneous multithreading processors," Proceedings 28th Annual International Symposium on Computer Architecture, Goteborg, Sweden, 2001, pp. 40-51 (Year: 2001).*

*Primary Examiner* — Daniel C. Chappell
(74) *Attorney, Agent, or Firm* — Leveque Intellectual Property Law, P.C.

(57) ABSTRACT

A system, apparatus and method for accessing an electronic storage medium, such as a memory location storing a page table, or range table. A virtual address of the electronic storage medium is identified that corresponds to designated portions, such as a range of addresses of the electronic storage medium. The virtual address is translated to a corresponding physical address and one or more commands are identified as being excluded from execution in the designated portions of the electronic storage medium. This may be accomplished by using a routine such as mprotect( ). A fault indication, or decoration, is provided to meta-data associated with the physical address, which is associated with the designated portions of the electronic storage medium when excluded commands are provided to the physical address. A mechanism, such as hardware, is actuated when the fault is generated.

20 Claims, 8 Drawing Sheets

(58) Field of Classification Search
CPC .. G06F 2009/3883; G06F 2009/45562–45595;
G06F 2015/761–768
See application file for complete search history.

(56) References Cited

U.S. PATENT DOCUMENTS

| | | | | |
|---|---|---|---|---|
| 7,552,308 | B2* | 6/2009 | Litke | G06F 12/08 |
| | | | | 711/202 |
| 8,161,246 | B2* | 4/2012 | Hooker | G06F 12/10 |
| | | | | 711/137 |
| 8,195,890 | B1* | 6/2012 | James | G06F 12/0824 |
| | | | | 711/118 |
| 8,645,644 | B2* | 2/2014 | Guthrie | G06F 12/0815 |
| | | | | 711/159 |
| 8,996,840 | B2* | 3/2015 | Auernhammer | G06F 12/1027 |
| | | | | 711/202 |
| 9,569,361 | B2* | 2/2017 | Radhakrishnan | G06F 12/10 |
| 9,569,363 | B2* | 2/2017 | Hooker | G06F 12/1027 |
| 9,792,215 | B2* | 10/2017 | Podaima | G06F 12/0862 |
| 10,037,280 | B2* | 7/2018 | Podaima | G06F 12/10 |
| 10,642,742 | B2* | 5/2020 | Heremagalur Ramaprasad | |
| | | | | G06F 12/0811 |
| 2003/0079136 | A1* | 4/2003 | Ericta | H04L 63/102 |
| | | | | 713/185 |
| 2010/0161928 | A1* | 6/2010 | Sela | G06F 12/1441 |
| | | | | 711/163 |
| 2011/0072234 | A1* | 3/2011 | Chinya | G06F 12/1027 |
| | | | | 711/207 |
| 2013/0132702 | A1* | 5/2013 | Patel | G06F 12/08 |
| | | | | 711/202 |
| 2015/0187435 | A1* | 7/2015 | Rieschl | G06F 3/0683 |
| | | | | 714/720 |
| 2015/0254189 | A1* | 9/2015 | Coppola | G06F 12/145 |
| | | | | 711/163 |

\* cited by examiner

SYSTEM, METHOD AND APPARATUS FOR FINE GRANULARITY ACCESS PROTECTION

BACKGROUND

In computer architecture and design, it is helpful to utilize techniques for mitigating against exploitation of heap buffer overflows. One technique is the use of guard pages, which are unmapped pages placed between all memory allocations of one page or larger. Typical production software utilizes guard-pages to bound array access such that if accesses are made to regions outside the boundary of the intended allocation, a fault is thrown with an error, for example SIGBUS or SIGSEGV (depending on implementation).

Many memory systems are moving to range-based accesses (especially non-volatile memory systems), however, these memory systems must still support legacy software. To provide guard-page protection on these systems, another range must be allocated, which is wasteful and inefficient.

BRIEF DESCRIPTION OF THE DRAWINGS

The accompanying drawings provide visual representations, which will be used to more fully describe various representative embodiments and can be used by those skilled in the art to better understand the representative embodiments disclosed and their inherent advantages. In these drawings, like reference numerals identify corresponding elements.

DETAILED DESCRIPTION

Figure 1:
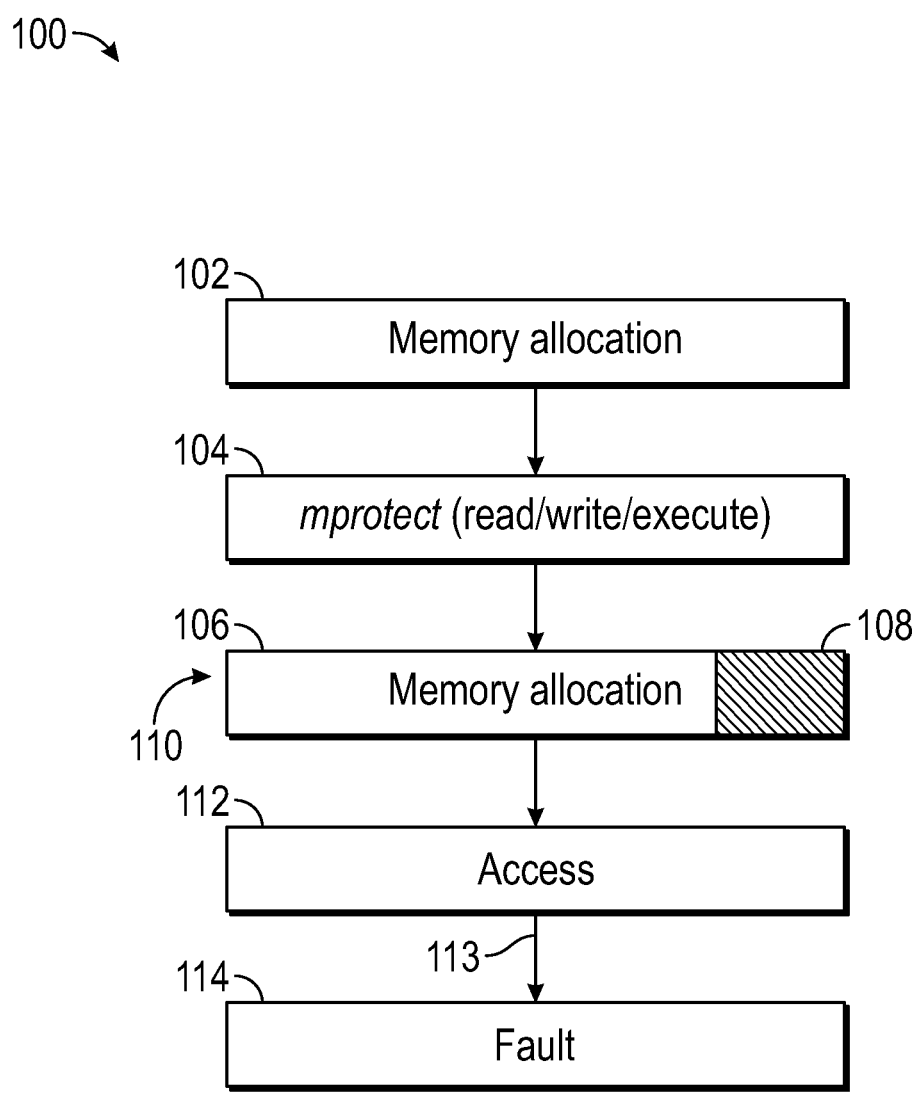
FIG. 1 illustrates a diagram of a scheme using page protections.

While this disclosure is susceptible of embodiment in many different forms, there is shown in the drawings and will herein be described in detail specific embodiments, with the understanding that the present disclosure is to be considered as an example of the principles described and not intended to limit the disclosure to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprise", "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The following terms may be used in this description of various embodiments described herein.

Accessing: granting permission, liberty, or ability, to communicate with, or pass information, data and/or electronic signals to and from.

Access rights: permissions that are granted to a user, or to an application, to read, write and/or erase files in a memory or electronic storage location. Access rights also extend to execution of data at a particular location in combination with read, write, or erase rights. Access rights can be tied to a particular client or server, folders within that machine or to specific programs and data files.

API: application programming interface. An API is specification, often realized through machine code, that allows two entities (one software, one hardware or software), to communicate with each other. The API defines the correct way for a developer to write a program that requests services from an operating system (OS), other application, or hardware device.

Auxiliary: additional, supplemental.

Barrier instruction: an instruction that causes a CPU or compiler to enforce an ordering constraint on memory operations issued prior to and after the instruction.

Buffer: a temporary storage area, usually in random access memory (RAM). The purpose of most buffers is to act as a holding area, enabling the CPU to manipulate data before transferring it to a device.

Cache: Cache memory, is memory that a computer microprocessor can access more quickly than it can access regular RAM. This memory is typically integrated directly with the processing element (on same chip) or placed on a separate chip that has a separate bus interconnect with the CPU.

Cache memory is a computer memory that provides high-speed data access to a processor and stores frequently used instructions or data needed by a processing element for execution of computer programs, applications and data.

CPU: central processing unit or processing element; the electronic circuitry within a computer that carries out the instructions of a computer program by performing the basic arithmetic, logical, control and input/output (I/O) operations specified by the instructions.

DAX: direct access. DAX is a mechanism that enables direct access to files stored in persistent memory arrays without the need to copy the data through the page cache.

Execution: the basic operational process of a computer. It is the process by which a computer retrieves a program instruction from its memory, determines what actions the instruction dictates, and carries out those actions. This cycle is repeated continuously by the central processing unit (CPU), from boot-up to when the computer is shut down.

Flowchart: a type of diagram that represents an algorithm, workflow or process. The flowchart shows the steps as boxes of various kinds, and their order.

glibc: GNU project's implementation of the standard "C" library. The library is a collection of subprograms that any programmer can employ to reduce the amount of complex and repetitive source code that has to be written for individual programs.

Granularity: the extent to which a system contains separate components (like granules). The more components in a system—or the greater the granularity—the more flexible it is.

Interface: either a hardware connection or a user interface. An interface can also be used as a verb, describing how two devices connect to each other. A hardware interface is used to connect two or more electronic devices together and may relate to one or more APIs.

I/O: input/output, the transfer of data between a processor and a peripheral device in a data processing system. I/O devices may include keyboards, displays, pointing devices, etc. that can be coupled either directly or through intervening I/O controllers.

Metadata: additional data, typically summarizes basic information about data, which can make finding and working with particular instances of data easier.

Micro-architectural: computer organization, the way a given instruction set architecture (ISA), is implemented in a particular processor.

Mnemonic: name or identifier or code that is shorter in length but provides the same functionality as the original function.

Module: a component or part of a program or device that can contain hardware or software, or a combination of hardware and software. In a module that includes software, the software may contain one or more routines, or subroutines. One or more modules can make up a program and/or device. A module may also be an electronic storage location or memory location, which may be operatively coupled to one or more processors.

Non-volatile memory: memory that is typically used for a task of secondary storage, or long-term persistent storage.

Operating System: system software that manages computer hardware and software resources and provides common services for computer programs.

Operation: a single step performed by a computer in the execution of a program.

Ordering Tag: kind of metadata that helps describe an item and allows it to be found again by browsing or searching.

Peripheral: a computer device, such as a keyboard or printer, which is not part of the essential computer (i.e., the memory and microprocessor). These auxiliary devices are typically intended to be connected to the computer.

PMEM: persistent memory. Any method or apparatus for efficiently storing data structures such that the data structures can continue to be accessed using memory instructions or memory APIs even after the end of the process that created or last modified the data structures.

POSIX API: Portable Operating System Interface is a set of standard operating system interfaces based on the Unix operating system. This permits programs to be moved among different computer systems without having to be recoded.

Queue: a sequence of work objects that are waiting to be used by a processing element or processing module or processing code.

Source Code: any collection of code, possibly with comments, written using human readable programming language, usually as plain text. The source code of a program is specially designed to facilitate the work of computer programmers, who specify the actions to be performed by a computer mostly by writing source code. The source code is often transformed by an assembler or compiler, into binary machine code understood by the computer. The machine code might then be stored for execution at a later time. Alternatively, source code may be interpreted and thus immediately executed.

Tag: a formatting tool using a code to describe content. A term or identifier assigned to a piece of information or item to help describe the information or item.

Providing efficient means to maintain a current model of faulting is desirable, so that software receives the behavior from the hardware that it expects; for both the translation system and application thread. Applications such as Valgrind, MySQL, glibc (and end of strings), and similar applications use guard-pages extensively, providing a fast path that is precise and is desirable for storage class memory, non-volatile (NV) and range-based translation mechanisms.

FIG. 1 illustrates a diagram of a software scheme 100 using page protections. As shown in FIG. 1, memory allocation 102 sends a request to mprotect 104, which sends an instruction to memory allocation 110. Memory allocation 110 includes portion, or range 106, and array boundary portion 108, which receives the mprotect instruction. Access arrow 112, arrow 113 and fault 114 are shown.

The memory allocation 102 may be represented as a register or electronic storage medium, non-transitory computer-readable medium, or other memory. However, memory allocation is a process by which computer programs and services are assigned with physical or virtual memory space. Memory allocation is the process of reserving a partial or complete portion of computer memory for the execution of programs and processes.

A function 104, which may be a series of steps, or a software module, or source code or algorithm, or any combination thereof that changes the access protections for the calling process's memory pages containing any part of the address range in an interval. One function that changes access protections is mprotect( ), that is adapted to change access specified by prot for those whole pages containing any part of the address space of the process starting at address addr and continuing for len bytes. The parameter prot determines whether read, write, execute, or some combination of accesses are permitted to the data being mapped. The prot argument should be either:

PROT_NONE or the bitwise inclusive OR of one or more of PROT_READ, PROT_WRITE and PROT_EXEC.

If an implementation cannot support the combination of access types specified by prot, the call to mprotect( ) fails.

An implementation may permit accesses (access rights) other than those specified by prot; however, no implementation permits a write to succeed where PROT_WRITE has not been set or permits any access where PROT_NONE alone has been set. Implementations will support at least the following values of prot: PROT_NONE, PROT_READ, PROT_WRITE, and the inclusive OR of PROT_READ and PROT_WRITE. If PROT_WRITE is specified, the application must have opened the mapped objects in the specified address range with write permission, unless MAP PRIVATE was specified in the original mapping, regardless of whether the file descriptors used to map the objects have since been closed.

When mprotect( ) fails for reasons other than [EINVAL], the protections on some of the pages in the range [addr, addr+len) may have been changed.

The function shall fail if: [EACCES] The prot argument specifies a protection that violates the access permission the process has to the underlying memory object. Addresses in the range [addr,addr+len) are invalid for the address space of a process, or specify one or more pages which are not mapped. [ENOMEM] In particular it can be used to change existing code mappings to be writable. Whether PROT_EXEC has any effect different from PROT_READ is architecture and kernel version dependent. mprotect( ) changes protection for the calling process's memory page(s) containing any part of the address range in the interval [addr,addr+len−1]. addr must be aligned to a page boundary.

If the calling process tries to access memory in a manner that violates the protection, then the kernel generates a SIGSEGV signal for the process.

POSIX, such as a POSIX compliant operating system, permits a call mprotect( ) on any address in a process's address space (except for the kernel vsyscall area). mprotect( ) can be used to change existing code mappings to be writable.

The technique of FIG. 1 can be used to provide bounds protection, the end result and intent are completely orthogonal to the protection API used to implement it.

The granularity of mprotect( ) is not specified, however, most implementations implement this feature using a full virtual-page (the current page size is not a significant consideration for the use case) because there is not a desirable way to do otherwise. Therefore, a hardware bounds checking mechanism can utilize whatever granularity is actually efficient (per mprotect specification).

Alternatively, it is an embodiment that there is a range-based allocation scheme that is useful for data centers and storage class memories.

Figure 2:
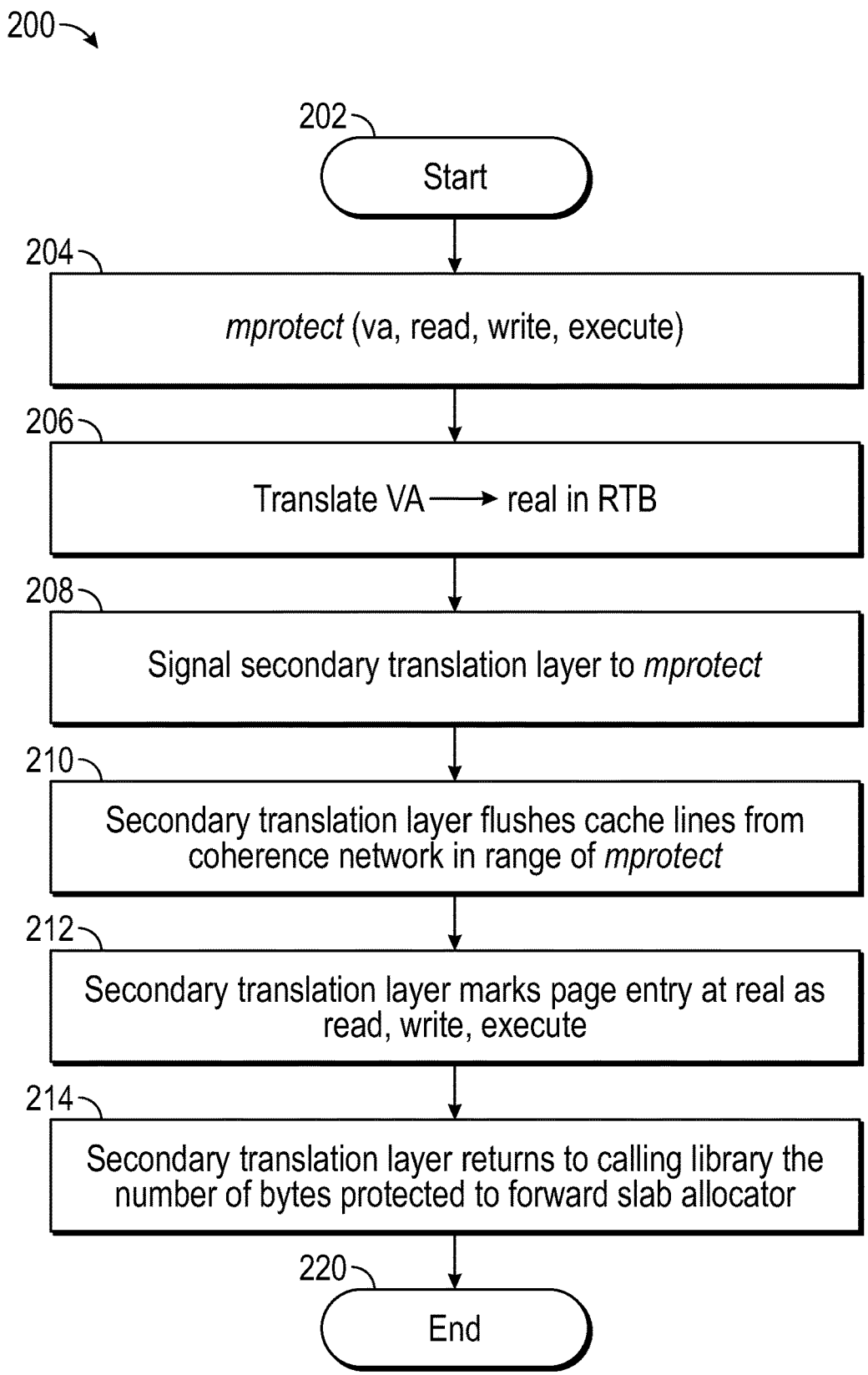
FIG. 2 illustrates an embodiment to protect a memory range as described herein.

FIG. 2 shows an embodiment 200 that enables an interface (POSIX API specification) to actuate a hardware mechanism to provide desired protections with a smaller memory footprint that is page-size, cache-line size, and memory technology agnostic.

As shown in FIG. 2, the process 200 begins (202). The function mprotect( ) is accessed (204) to identify virtual addresses, or a range of addresses, that are desired to be protected.

The identified virtual addresses, or range of addresses, are translated into a corresponding physical address (206). These physical addresses can be intermediate physical addresses.

A signal is sent to a secondary translation layer (208) so that the designated physical addresses, corresponding to the virtual addresses, or address ranges, are identified, by a memory core, to be inaccessible. The secondary translation layer is a layer of software that converts one set of addresses into another set of codes. The secondary translation layer may interface between software and/or hardware components.

The secondary translation layer flushes cache lines from a coherence network in the range of mprotect (210).

The secondary translation layer marks a page entry at the corresponding physical address with a command (no rd, wr, exec) (212).

The secondary translation layer transmits to calling library the number of bytes protected to forward slab allocator to following byte for allocation (214).

The process ends (220).

As shown in relation to FIG. 2, memory range can be protected by issuing a call to mprotect( ) to the memory fabric. The request generates a decoration to the meta-data for the physical representation of that address (e.g., a page) so that subsequent loads to that address will generate a fault. There are two mechanisms that can be used to generate this fault when range-based translation/allocation mechanisms are used. The first and second apply to systems with combined protection/placement paging systems. The third applies to two stage translation system such as those that utilize an intermediate address space.

Figure 3:
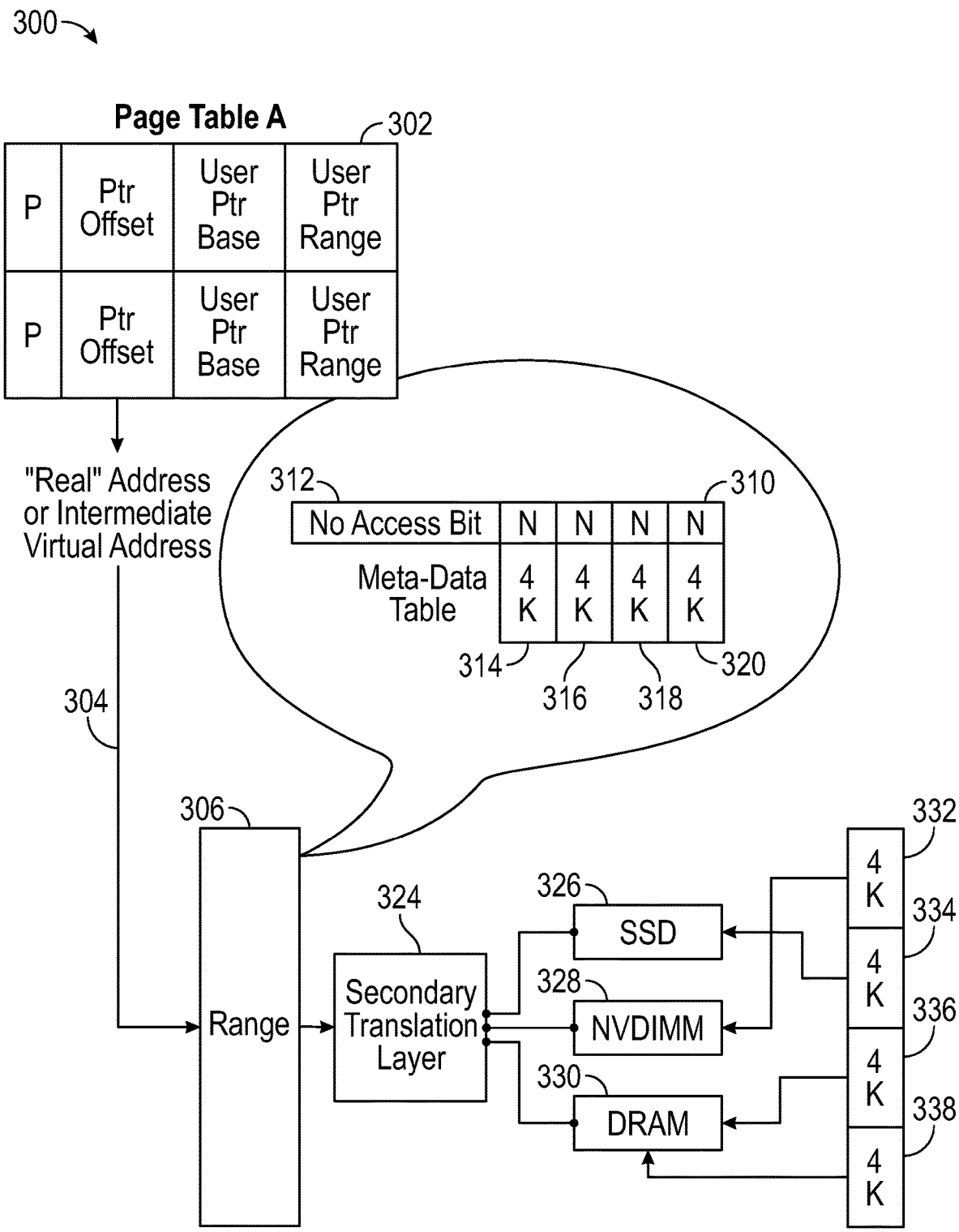
FIG. 3 illustrates yet another embodiment described herein.

FIG. 3 shows a representation 300 that includes page table 302, which provides a "real" address or intermediate virtual address 304 to range module 306. The range module 306 includes a register with a no access bit 312 and other bits 310. Meta-data table includes areas 314, 316, 318 and 320.

The range module 306 is operatively coupled to secondary translation layer 324. Secondary translation layer 324 may be a translational layer and includes SSD (solid state drive) module 326, NVDIMM (non-volatile dual in-line memory module) module 328 and DRAM (dynamic random access memory) module 330. The SSD module 326 has register 334. NVDIMM module 328 has register 332. DRAM module 330 has registers 336 and 338.

As shown in FIG. 3, the no-access bit is set within the secondary translation layer meta-data table per page at whatever granularity the underlying physical representation is in (e.g., page granularity) so that on an access and translation from the secondary source, the data is forwarded on the coherence network with the meta-data that indicates that it is not accessible. It should be noted, that the no-access bit is set within the meta-data table only, no actual physical memory need be allocated or exist to perform this function.

Mechanism 1

A common pattern with non-volatile (NV) systems is to directly map the NV memory using a mechanism such as DAX, which is a mechanism that enables direct access to files stored in persistent memory arrays without copying the data through the page cache. This DAX mechanism maps contiguous virtual pages or a huge page to large ranges of physical NV memory. The advantage of this is that the memory/storage is directly addressable without paging through DRAM. The disadvantage of this is that potentially one huge page covers the entire memory segment. This is efficient for translation, however, not efficient for guard pages if the NV is to be used for standard functions that typically require them (see most of glibc).

Figure 4:
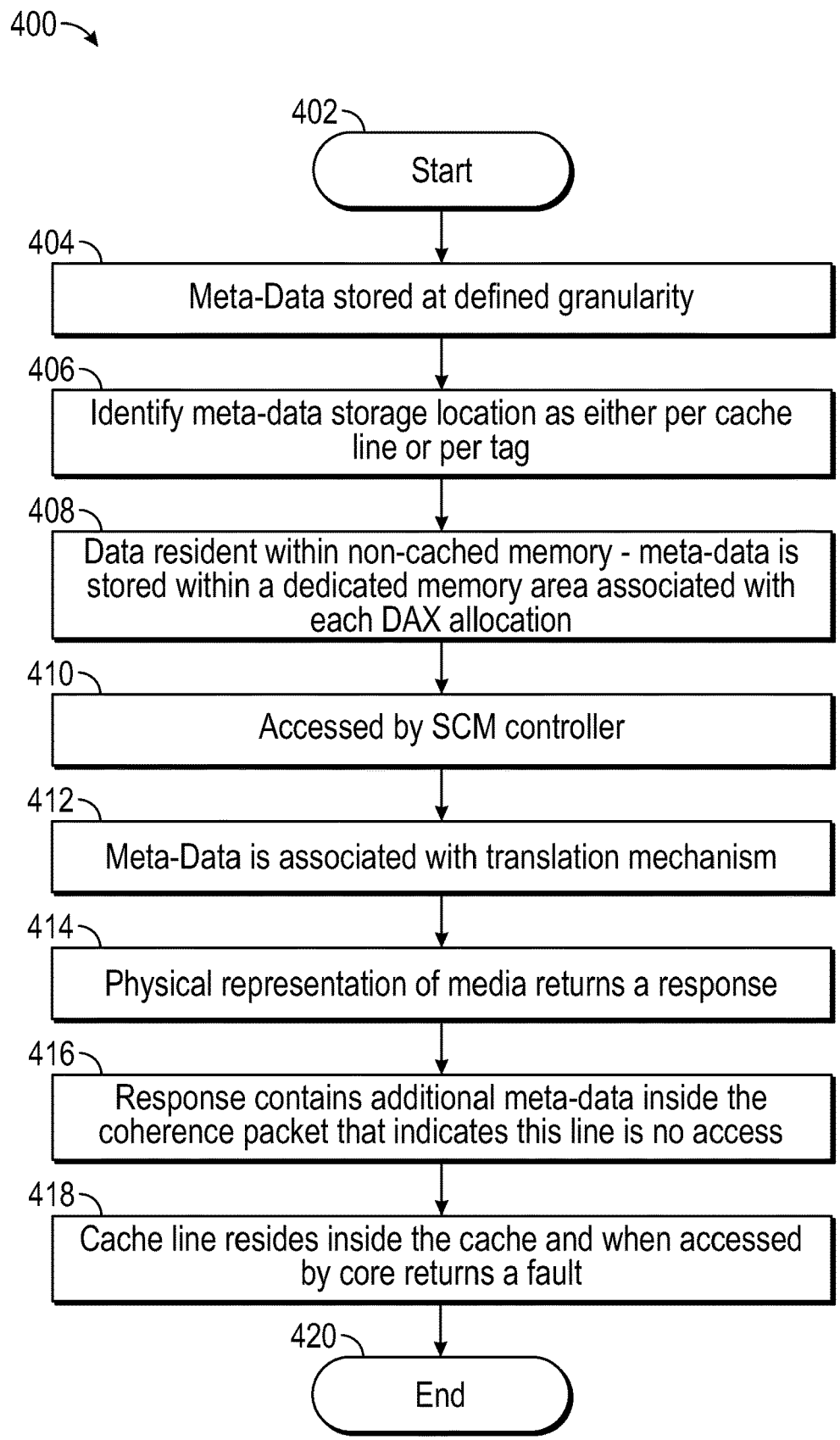
FIG. 4 illustrates a flowchart according to yet another embodiment described herein.

FIG. 4 illustrates a flowchart 400 of steps that may be stored on non-volatile memory, non-transitory computer readable medium, or other suitable memory or computer-usable medium and in any suitable programming language.

According to FIG. 4, the embodiment can be considered as having has four parts:

1. Beginning with start (402), the meta-data stored at some implementation defined granularity (404) (e.g., 64*b* unsigned integer value representing an offset inside the region that is to be used as a guardpage). The meta-data storage location may be either per cache line or per tag for each cache line (as described in relation to mechanism 2 described herein) (406). When data is resident within the non-cached memory the meta-data is stored within a dedicated memory area associated with each DAX allocation (408) and accessed by the SCM controller (410).
2. The meta-data is associated with the translation mechanism (412) so that when the physical representation of the media inside the media translation layer returns a response with data to a requestor (414).
3. That response contains additional metadata inside the coherence packet that indicates that this line is no-access (416).
4. The cache line can sit inside the cache and when accessed by the core, will return a fault (418). The process ends (420).

This approach enables the pre-fetcher to continue to fetch data, regardless of faulting status, as they do in current systems, while preserving the ability to fault if and when the memory is actually dereferenced and accessed by the core. The pre-fetcher operation speeds up fetch operations by beginning a fetch operation whose result is expected to be needed soon. A cache pre-fetch is a speed-up technique used by computers where instructions are fetched before they are needed. This enables fast faults; however, it has the downside of creating cache lines that are essentially unused.

Mechanism 2 (Tag Array)

Figure 5:
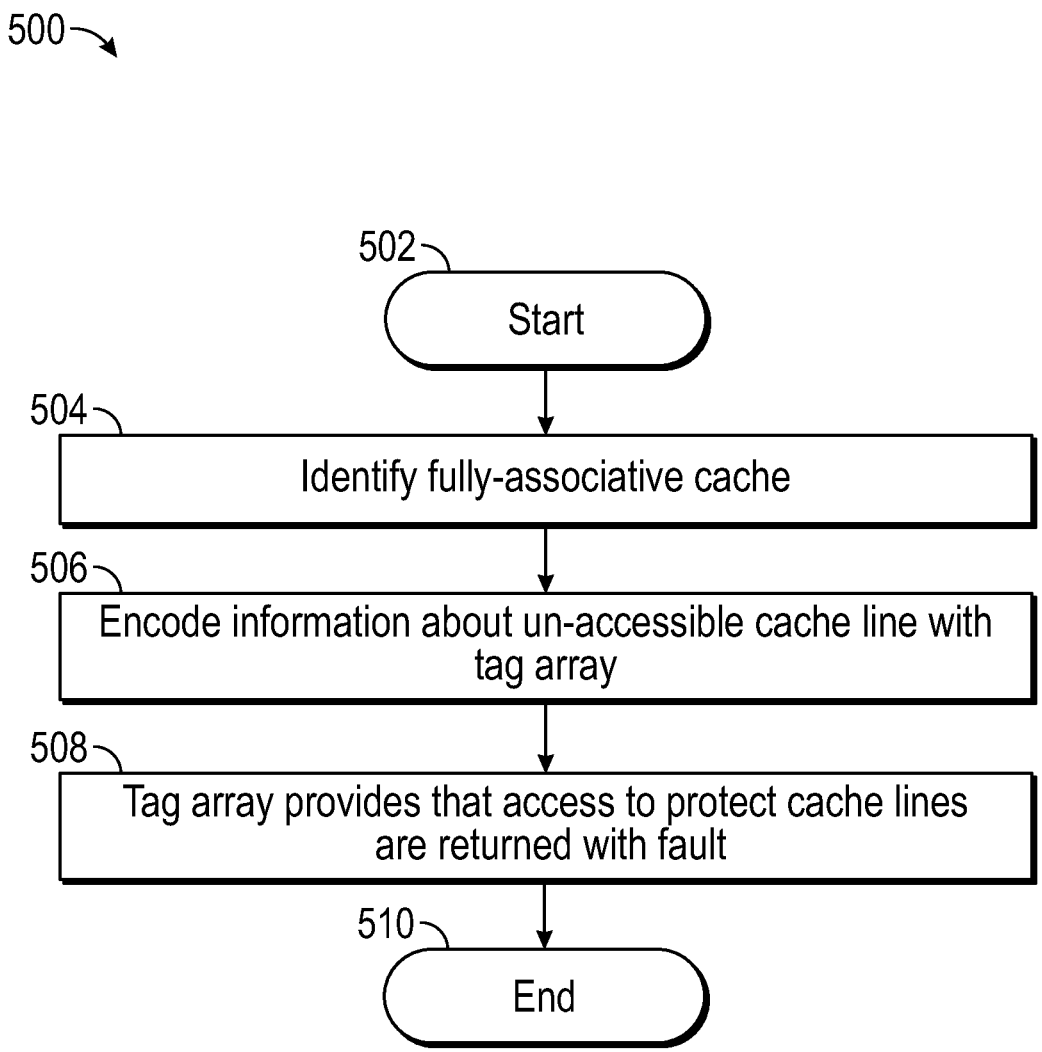
FIG. 5 illustrates a flowchart according to yet another embodiment.

FIG. 5 illustrates a flowchart 500 of steps that may be stored on non-volatile memory or other suitable memory or computer-usable medium and in any suitable programming language.

As shown in FIG. 5, the process begins (502) and in the case of a fully-associative cache (504), which may be identified.

The information about the un-accessible cache-lines, can be encoded within the tag array (506).

The cache is not physically occupied with unusable cache-lines (they can be thrown away if they arrive on a prefetch), while the tag array works to provide that accesses to these protected cache-lines are returned with appropriate faults (as the information is stored in their arrays) (508) and the process ends (510). This implementation allows very fine granularity no-access protection for very large granular data mappings (e.g., huge pages, memory ranges, or data object representations).

Mechanism 3 (Double Faulting)

Figure 6:
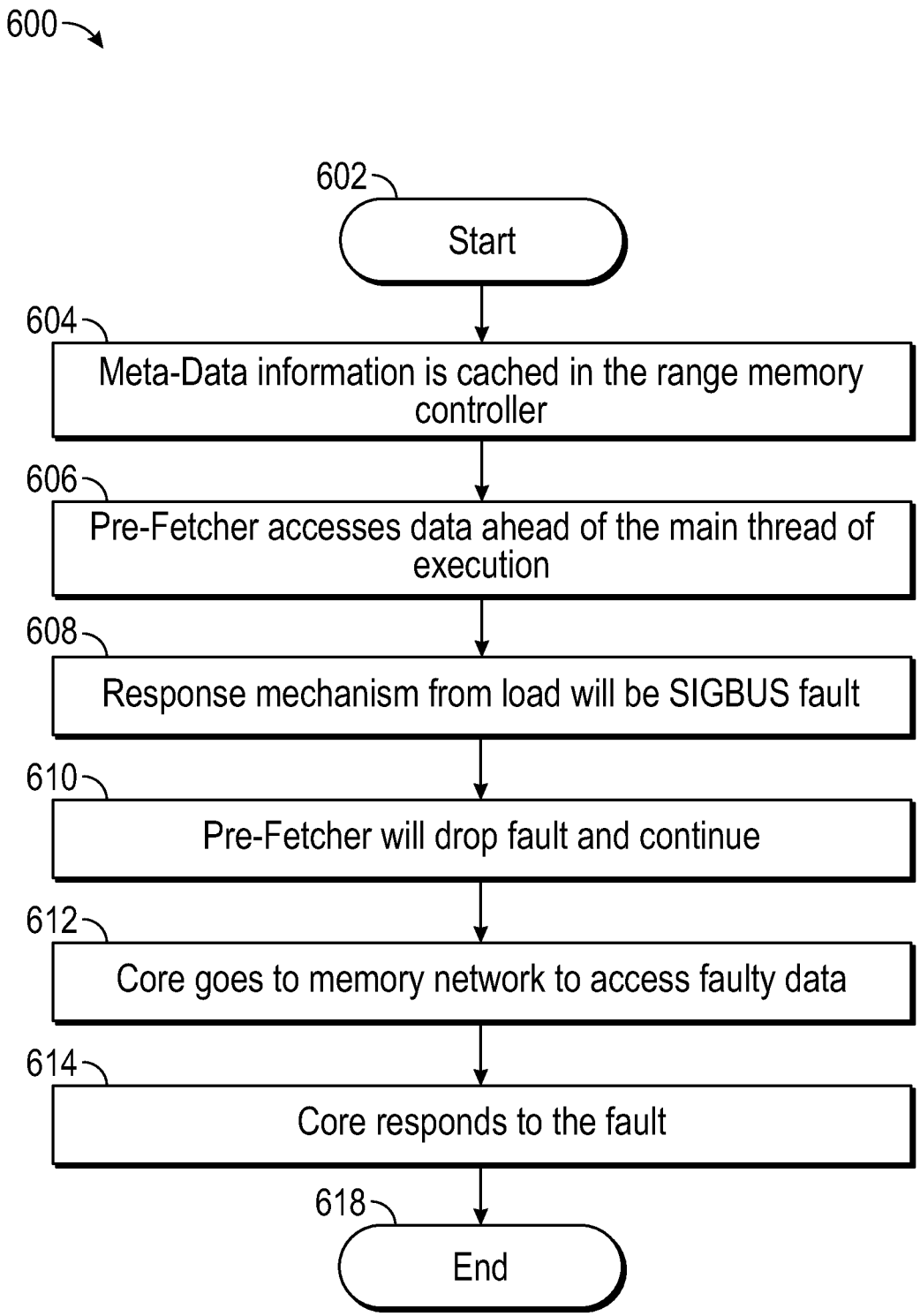
FIG. 6 illustrates a flowchart according to yet another embodiment.

FIG. 6 illustrates a flowchart 600 according to yet another embodiment. Flowchart 600 includes a series of steps that may be stored on non-volatile memory or other suitable memory or computer-usable medium and in any suitable programming language. For range- and object-based translation mechanisms, or those with a secondary translation layer, which may be an intermediate address space given the first address has to be dependent on the second address, there is a more efficient mechanism, however, it is useful to change to the prefetching mechanisms so that they can take faults and silence them so that the second layer translation system can catch the fault.

1. The algorithm 600 begins with start (602). Meta-data information is cached in the range memory controller (604), in one embodiment that is the secondary translation layer, just as before. (see meta-data store in FIG. 3)
2. In most architectures, the pre-fetcher accesses data ahead of the main thread of execution, pulling in data to reduce latency of access (606).
3. On a load, the response mechanism from the load will be a SIGBUS (or equivalent) fault (608), the pre-fetcher will simply have to drop this fault and continue (610).
4. The net result of not responding to that fault is that the core must go out to the memory network again (in this case the secondary translation layer) to access the faulting data (the guard-page) (612).
5. Once the core attempts to do this, the core responds to the fault directly (614), resulting in an equivalent action to having fine granularity guard pages, but with the performance of a larger granule of translation. The process ends (618).

For a system with coherent pages that can be shared amongst coherent agents (memory nodes), the guard bits are also coherent, i.e., if pages exist in multiple secondary translation layer nodes, then the guard bits from the translation mapping also exist in those nodes. For example, a physical mapping (page) in "shared" state in memory node 1, can exist in any other memory node in "shared" state. If that entry is a guard granule, then it also exists in the "shared" state. Any change of permissions would invalidate the other "shared" entries and then change the state, preserving coherence.

Figure 7:
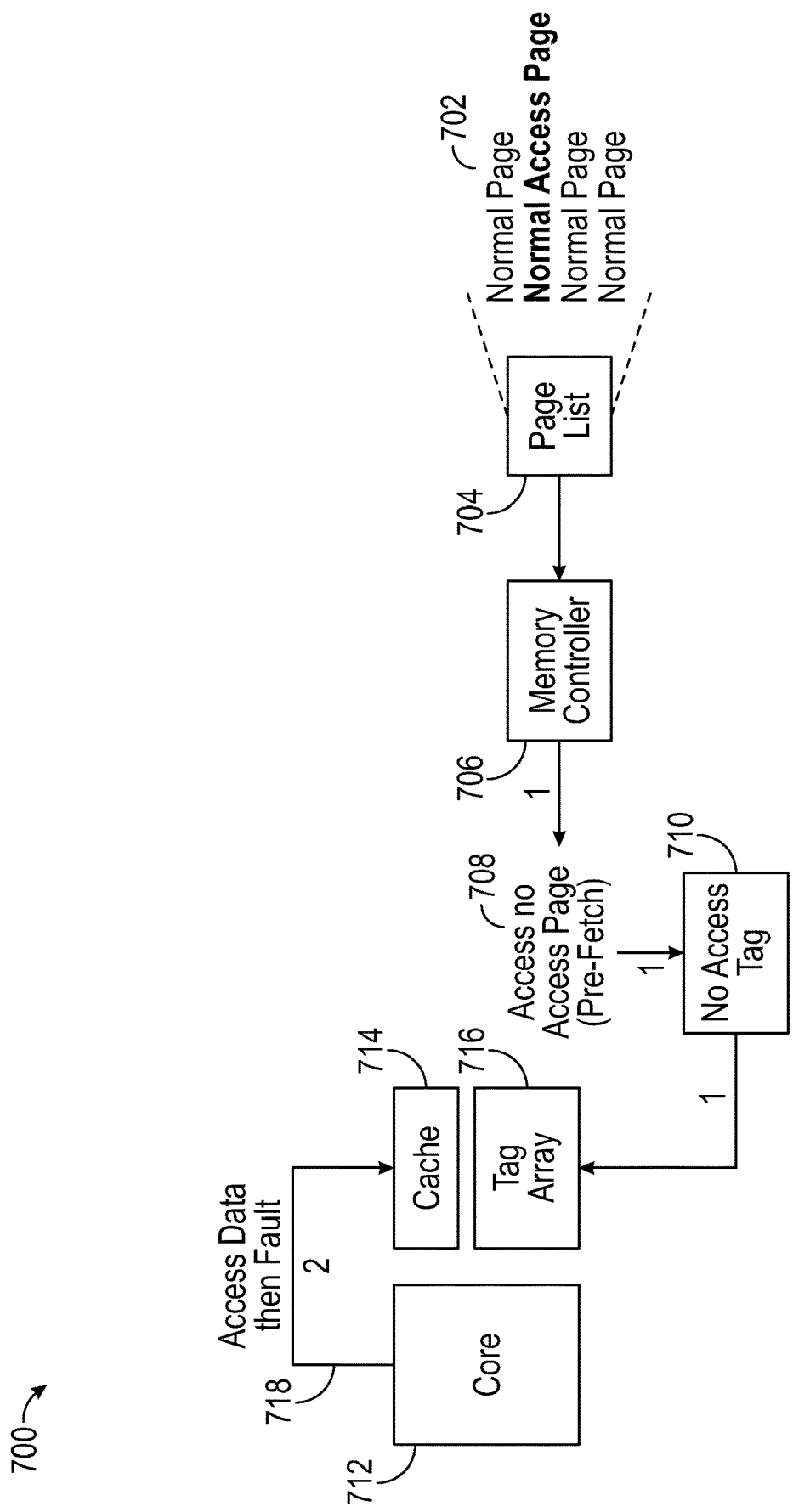
FIG. 7 illustrates a process according to yet another embodiment.

FIG. 7 illustrates a process 700 according to yet another embodiment described herein. As shown in FIG. 7, page data 702 includes normal pages data and no access page. The page data 702 is provided to page list 704, which is operatively coupled to memory controller 706. Access no access page (pre-fetch) 708 is provided to no access tag 710. The no access tag 710 is provided to tag array 716, which is operatively coupled to core 712 and cache 714. The core 712 is in communication with cache 714 as shown by arrow 718.

Figure 8:
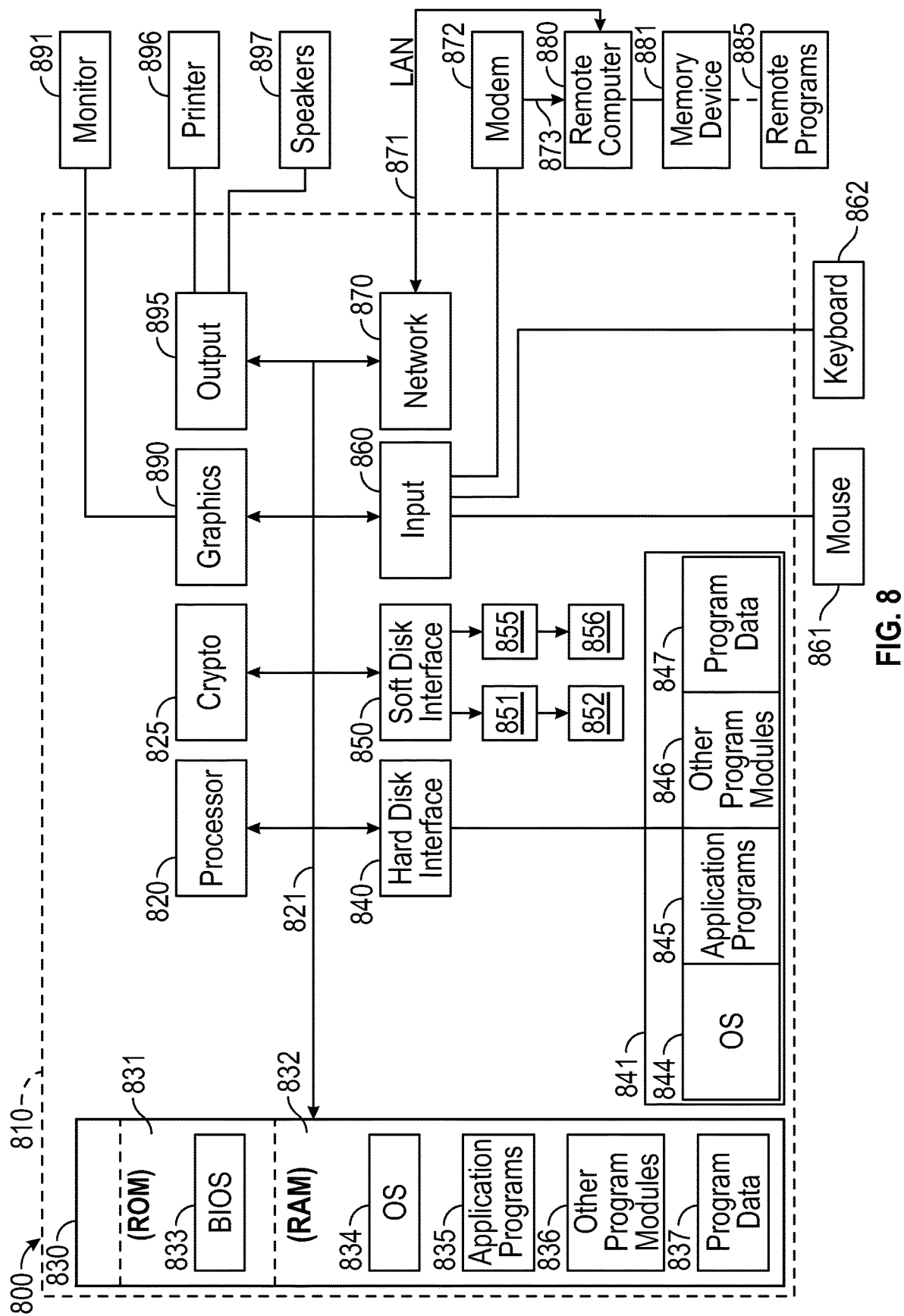
FIG. 8 illustrates an apparatus that may be used to implement the embodiments described herein.

As can be seen from the above description and by use of the apparatus as described in FIG. 8, there is disclosed herein a system and method comprising: accessing an electronic storage medium, such as a memory location storing a page table, or range table. A virtual address of the electronic storage medium is identified that corresponds to designated portions, such as a range of addresses of the electronic storage medium. The virtual address is translated to a corresponding physical address and one or more commands are identified as being excluded from execution in the designated portions of the electronic storage medium. This may be accomplished by using a routine such as mprotect( ). A fault indication, decoration, is provided to meta-data associated with the physical address, which is associated with the designated portions of the electronic storage medium when excluded commands are provided to the physical address. A mechanism, such as hardware, is actuated when the fault is generated.

The mechanism may include defining granularity of the meta-data and associating the meta-data with the mechanism, which may include translation or actuating, such that the physical address returns a response to the excluded commands.

The meta-data has an associated storage location, which may be per cache line and/or per tag. The one or more cache lines reside in the electronic storage medium and when accessed by an excluded instruction, return a fault. The fault indication contains additional meta-data in a coherence packet that indicates that an associated line is not accessible.

The actuating a mechanism when the fault is generated may comprise encoding information related to excluded cache lines with a tag array and/or caching the meta-data in the designated portions of the electronic storage medium.

The apparatus, system and method also access selected meta-data that precedes execution of commands and reduce latency of access based on the accessed selected meta-data.

It is also an embodiment of the disclosure to identify coherent pages in the electronic storage medium; and identify guard bits that are coherent in a same node of the electronic storage medium. A pre-fetch instruction is useful to drop a fault when a response mechanism from a load is a fault. Faulting data is accessed based on the fault FIG. 8 illustrates a model computing device 800 in the form of a computer 810 and various peripheral and network components that can perform one or more computer-implemented steps.

One or more of the embodiments may be performed on a computing device. A computing device may be understood to be any device having a processor, memory unit, input, and output. This may include, but is not intended to be limited to, cellular phones, smart phones, tablet computers, laptop computers, desktop computers, personal digital assistants, graphical processing units, field programmable gate arrays, etc. Components of the computer 810 may include, but are not limited to, a processing unit 820, a system memory 830, and a system bus 821 that couples various system components including the system memory to the processing unit 820.

The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI).

The computer 810 may also include a cryptographic unit 825. Briefly, the cryptographic unit 825 has a calculation function that may be used to verify digital signatures, calculate hashes, digitally sign hash values, and encrypt or decrypt data. The cryptographic unit 825 may also have a protected memory for storing keys and other secret data. In other embodiments, the functions of the cryptographic unit may be instantiated in software and run via the operating system.

Computer 810 typically includes a variety of computer readable media. Computer readable media can be any available media that can be accessed by a computer 810 and includes both volatile and nonvolatile media, removable and non-removable media. By way of example, and not limitation, computer readable media may include computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer 810.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates an operating system (OS) 834, application programs 835, other program modules 836, and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives, and their associated computer storage media discussed above and illustrated in FIG. 8, provide storage of computer readable instructions, data structures, program modules and other data for the computer 810. In FIG. 8, for example, hard disk drive 841 is illustrated as storing an OS 844, application programs 845, other program modules 846, and program data 847. Note that these components can either be the same as or different from OS 834, application programs 835, other program modules 836, and program data 837.

The OS 844, application programs 845, other program modules 846, and program data 847 are given different numbers here to illustrate that, at a minimum, they may be different copies. A user may enter commands and information into the computer 810 through input devices such as a keyboard 862 and cursor control device 861, commonly referred to as a mouse, trackball or touch pad.

Other input devices (not shown) may include a microphone, joystick, game pad, satellite dish, scanner, or the like.

These and other input devices are often connected to the processing unit 820 through a user input interface 860 that is coupled to the system bus but may be connected by other interface and bus structures, such as a parallel port, game port or a universal serial bus (USB). A monitor 891 or other type of display device is also connected to the system bus 821 via an interface, such as a graphics controller 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all the elements described above relative to the computer 810, although only a memory storage device 881 has been illustrated in FIG. 8. The logical connections depicted in FIG. 8 include a local area network (LAN) 871 and a wide area network (WAN) 873 but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on memory device 881.

The communications connections 870 and 872 allow the device to communicate with other devices. The communications connections 870 and 872 are examples of communication media. The communication media typically embodies computer readable instructions, data structures, program modules or other data in a modulated data signal such as a carrier wave or other transport mechanism and includes any information delivery media.

A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if desired, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wire line, optical fiber cable, radio frequency (RF), etc.

Computer program code for carrying out operations of the present disclosure may be written in any combination of one or more programming languages, including an object-oriented programming language such as Java, Smalltalk, C++, C# or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus, systems and computer program products according to embodiments described herein. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer, or other programmable data processing apparatus, create means for implementing the functions/acts specified in the flowchart and/or block diagram block or blocks. These computer program instructions may also be stored in a computer-readable medium that can direct a computer or other programmable data processing apparatus, to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer, or other programmable apparatus to produce a computer-implemented process such that the instructions which execute on the computer or other programmable apparatus, provide processes for implementing the functions/acts specified in the flowchart and/or block diagram block or blocks.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

It can be seen that the system and methodologies presented herein provide an advancement in the state of the art.

Accordingly, some of the disclosed embodiments are set out in the following.

A method comprising: accessing an electronic storage medium; identifying a virtual address of the electronic storage medium corresponding to designated portions of the electronic storage medium; translating the virtual address to a physical address that corresponds to the virtual address; identifying one or more commands that are excluded from execution in the designated portions of the electronic storage medium; generating a fault indication to meta-data associated with the physical address associated with the designated portions of the electronic storage medium when excluded commands are provided to the physical address; and actuating a mechanism when the fault is generated. This mechanism may be hardware.

Another embodiment is directed to the method as described above, where the actuating a mechanism when the fault is generated comprises: defining granularity of the meta-data; and associating the metadata with the mechanism where the physical address returns a response to the excluded commands.

Another embodiment is directed to the method as described above, where the meta-data has an associated storage location.

Another embodiment is directed to the method as described above, where the storage location is per cache line.

Another embodiment is directed to the method as described above, where the storage location is per tag.

Another embodiment is directed to the method as described above, where one or more cache lines reside in the electronic storage medium and when accessed by an excluded instruction, return a fault.

Another embodiment is directed to the method as described above, where the fault indication contains additional meta-data in a coherence packet that indicates that an associated line is not accessible.

Another embodiment is directed to the method as described above, where the actuating a mechanism when the fault is generated comprises: encoding information related to excluded cache lines with a tag array.

Another embodiment is directed to the method as described above, where the actuating a mechanism when the fault is generated comprises: caching the meta-data in the designated portions of the electronic storage medium.

Another embodiment is directed to the method as described above, further comprising: accessing selected meta-data that precedes execution of commands; and reducing latency of access based on the accessed selected meta-data.

Another embodiment is directed to the method as described above, further comprising: identifying coherent pages in the electronic storage medium; and identifying guard bits that are coherent in a same node of the electronic storage medium.

Another embodiment is directed to the method as described above, further comprising: a pre-fetch instruction that drops a fault when a response mechanism from a load is a fault.

Another embodiment is directed to the method as described above, further comprising: accessing faulting data based on the fault.

Another embodiment is directed to an apparatus comprising: a data set of cache lines having a magnitude; and a range module that accesses the data set, the range module adapted to: identify a virtual address of the data set; translate the virtual address to a physical address that corresponds to the virtual address; identify one or more commands that are excluded from execution in the data set; generate a fault indication, such as a decoration, to meta-data associated with the physical address when excluded commands are provided to the physical address; and actuate a mechanism when the fault is generated.

Another embodiment is directed to the apparatus as described above, where one or more cache lines reside in the data set and when accessed by an excluded instruction, return a fault.

Another embodiment is directed to the apparatus as described above, where the fault indication contains additional metadata in a coherence packet that indicates that an associated line is not accessible.

Another embodiment is directed to the apparatus as described above, further comprising a pre-fetch instruction that drops a fault when a response mechanism from a load is a fault.

Another embodiment is directed to a system comprising: a processor; and a non-transitory memory, operatively coupled to the processor that stores instructions to: access an electronic storage medium; identify a virtual address of the electronic storage medium corresponding to designated portions of the electronic storage medium; translate the virtual address to a physical address that corresponds to the virtual address; identify one or more commands that are excluded from execution in the designated portions of the electronic storage medium; generate a fault indication to meta-data associated with the physical address associated with the designated portions of the electronic storage medium when excluded commands are provided to the physical address; and actuate a mechanism when the fault is generated.

Another embodiment is directed to the system as described above, further comprising instructions for: dropping a fault when a response mechanism from a load is a fault.

Another embodiment is directed to the system as described above, further comprising an instruction to: cache the meta-data in the designated portions of the electronic storage medium.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

The invention claimed is:

1. A method for detecting unauthorized memory operations in a computer, the method comprising:

requesting, by a pre-fetcher of a cache of a processor of the computer, information associated with a virtual address, said requesting comprising:
  translating the virtual address to an intermediate address, the intermediate address associated with a physical address in a memory of the computer; and
  requesting information at the intermediate address;
determining, from a meta-data table, if access to the intermediate address is authorized or unauthorized;
for an authorized access to the intermediate address:
  translating the intermediate address to the physical address in the memory;
  retrieving information at the physical address; and
  generating a response comprising the retrieved information and a meta-data tag;
for an authorized access to the intermediate address:
  generating a fault indication to the meta-data tag of the response sending the response to the cache;
storing the response in a cache line of the cache; and
responsive to a processor requesting access to information associated with the virtual address:
  determining, from the meta-data tag of the response in the cache line, if the requested access is authorized or unauthorized; and
  actuating a fault mechanism of the computer when the access is determined to be unauthorized.

2. The method as claimed in claim 1, further comprising:
defining granularity of the meta-data table; and
associating the meta-data tag with the fault mechanism where the physical address returns a response to the unauthorized access.

3. The method as claimed in claim 2, where the meta-data table has an associated storage location.

4. The method as claimed in claim 3, where the storage location is per cache line.

5. The method as claimed in claim 3, where the storage location is per tag.

6. The method as claimed in claim 2, where one or more cache lines reside in the memory and when accessed by an unauthorized access, return a fault.

7. The method as claimed in claim 1, where the fault indication comprises meta-data in a coherence packet that indicates that an associated line is not accessible.

8. The method as claimed in claim 1, where the actuating a mechanism when the fault indication is generated comprises:
  encoding information related to unauthorized access to cache lines and storing the encoded information in a tag array.

9. The method as claimed in claim 1, where said actuating a fault mechanism comprises:
  caching the meta-data tag in designated portions of the memory.

10. The method as claimed in claim 9, further comprising:
  accessing a selected meta-data tag that precedes execution of commands; and
  reducing latency of access based on the accessed selected meta-data tag.

11. The method as claimed in claim 1, further comprising:
  identifying coherent pages in the memory; and
  identifying guard bits that are coherent in a same node of the memory.

12. The method as claimed in claim 1, where said requesting by the pre-fetcher comprises issuing a pre-fetch instruction for a load, the method further comprising:
  dropping a fault generated by a response mechanism in response to the load.

13. The method as claimed in claim 12, further comprising:
  accessing faulting data based on the fault.

14. An apparatus for detecting unauthorized memory operations comprising:
  a cache configured to store a data set of cache lines, the cache having a pre-fetcher configured to:
    translate a virtual address to an intermediate address, the intermediate address associated with a physical address in a computer memory; and
    send a pre-fetch instruction to request information at the intermediate address; and
  a range module that accesses the data set, the range module adapted to:
    determine, from a meta-data table, if access to the intermediate address is authorized or unauthorized;
    for an authorized access to the intermediate address:
      translate the intermediate address to the physical address in the computer memory;
      retrieve information at the physical address; and
      generate a response comprising the retrieved information and a meta-data tag; and
    for an unauthorized access to the intermediate address:
      generate a fault indication to the meta-data tag of the response; and
      send the response to the cache for storing in a cache line of the cache;
  where, the cache is further configured to:
    receive, subsequent to sending the pre-fetch instruction, a processor instruction requesting access to information associated with the virtual address;
    determine, from the meta-data tag of the response stored in the cache line, if the requested access is authorized or unauthorized; and
    actuate a fault mechanism when the access is determined to be unauthorized.

15. The apparatus as claimed in claim 14, where the response comprises a cache line of the data set.

16. The apparatus as claimed in claim 14, where the fault indication contains additional meta-data in a coherence packet that indicates that a cache line containing the requested information is not accessible.

17. The apparatus as claimed in claim 14, where the apparatus is configured to drop a fault generated by the pre-fetch instruction for the excluded intermediate address" with "the unauthorized access to the intermediate address.

18. A system for detecting unauthorized memory operations comprising:
  a cache;
  a pre-fetcher configured to:
    issue pre-fetch instructions for data stored at a plurality of pre-fetch addresses in a computer memory; and
    store responses to the plurality of pre-fetch instructions in the cache, a response comprising data and a meta-data tag, where the meta-data tag includes a fault indicator;
  a processor coupled to the cache and configured to:
    execute an instruction to access data associated with a designated address of the plurality of pre-fetch addresses;
    identify a stored response in the cache associated with the designated address;
    determine, based on a meta-data tag of the stored response, whether access to the data associated with the designated address is authorized or unauthorized; and actuate a fault mechanism when access to the data associated with the designated address is unauthorized.

19. The system as claimed in claim 18, where the system is configured for:

dropping a fault generated by a response mechanism in response to issuance of a pre-fetch instruction.

20. The system as claimed in claim 18, where the system is configured to:

store a meta-data table indicative of excluded addresses in the computer memory; and access the meta-data table to generate a meta-data tag in a response to a pre-fetch instruction for a pre-fetch address.

* * * * *

UNITED STATES PATENT AND TRADEMARK OFFICE
CERTIFICATE OF CORRECTION

PATENT NO. : 10,909,045 B2  
APPLICATION NO. : 16/228042  
DATED : February 2, 2021  
INVENTOR(S) : Jonathan Curtis Beard et al.

Page 1 of 1

It is certified that error appears in the above-identified patent and that said Letters Patent is hereby corrected as shown below:

In the Claims

Column 15, Line 16 should read 'for an unauthorized access to the intermediate address:'

Column 16, Lines 44-47 should read 'The apparatus as claimed in claim 14, where the apparatus is configured to drop a fault generated by the pre-fetch instruction for the unauthorized access to the intermediate address.'

Signed and Sealed this  
Thirtieth Day of March, 2021

Drew Hirshfeld  
*Performing the Functions and Duties of the*  
*Under Secretary of Commerce for Intellectual Property and*  
*Director of the United States Patent and Trademark Office*